US008898296B2

(12) United States Patent
Zeng et al.

(10) Patent No.: US 8,898,296 B2
(45) Date of Patent: Nov. 25, 2014

(54) DETECTION OF BOILERPLATE CONTENT

(75) Inventors: Jian Zeng, Beijing (CN); Youlin Li, Palo Alto, CA (US); Brian R. Murphy, Beijing (CN); Yuzhu Shen, Beijing (CN)

(73) Assignee: Google Inc., Mountain View, CA (US)

(*) Notice: Subject to any disclaimer, the term of this patent is extended or adjusted under 35 U.S.C. 154(b) by 223 days.

(21) Appl. No.: 13/564,034

(22) Filed: Aug. 1, 2012

(65) Prior Publication Data
US 2012/0297025 A1    Nov. 22, 2012

Related U.S. Application Data

(63) Continuation of application No. PCT/CN2010/000454, filed on Apr. 7, 2010.

(51) Int. Cl.
*G06F 15/173* (2006.01)
*G06F 17/30* (2006.01)

(52) U.S. Cl.
CPC .............................. *G06F 17/30864* (2013.01)
USPC ........................................ 709/224; 707/713

(58) Field of Classification Search
None
See application file for complete search history.

(56) References Cited

U.S. PATENT DOCUMENTS

| 6,647,381 | B1 | 11/2003 | Li et al. | |
|---|---|---|---|---|
| 6,897,885 | B1 | 5/2005 | Hao et al. | |
| 6,982,708 | B1 | 1/2006 | Mah et al. | |
| 7,120,868 | B2 * | 10/2006 | Salesin et al. | 715/249 |
| 7,200,606 | B2 | 4/2007 | Elkan | |
| 7,434,164 | B2 * | 10/2008 | Salesin et al. | 715/731 |
| 7,526,520 | B2 * | 4/2009 | Laux et al. | 709/203 |
| 7,568,154 | B2 * | 7/2009 | Salesin et al. | 715/243 |
| 7,590,628 | B2 | 9/2009 | Zhao | |
| 7,707,161 | B2 | 4/2010 | Hall et al. | |
| 7,890,627 | B1 * | 2/2011 | Thomas | 709/224 |
| 7,970,383 | B2 * | 6/2011 | Naganuma et al. | 455/412.1 |
| 7,974,983 | B2 * | 7/2011 | Goeldi | 707/769 |

(Continued)

FOREIGN PATENT DOCUMENTS

| CN | 1648900 A | 8/2005 |
|---|---|---|
| CN | 101741643 A | 6/2010 |
| JP | 2009169541 A | 7/2009 |
| WO | WO2011014979 A1 | 2/2011 |

OTHER PUBLICATIONS

International Search Report issued in PCT/CN2010/000454 on Jan. 20, 2011, 3 pages.

(Continued)

*Primary Examiner* — Brian P Whipple
*Assistant Examiner* — Michael A Chambers
(74) *Attorney, Agent, or Firm* — Fish & Richardson P.C.

(57) ABSTRACT

Methods, systems, and apparatus, including computer programs encoded on computer storage media, for generating query recommendations. One method provides selecting one or more nodes of an object model that models a resource as a hierarchy of nodes, and determining that the selected nodes exhibit one or more predefined traits that are characteristic of boilerplate content, wherein boilerplate content comprises content that is repeated in multiple resources of a particular web site or content which is not relevant to the main content of a resource. A score associated with the selected nodes is adjusted responsive to determining that the selected nodes exhibit the predefined traits, and information is provided to a query recommendation engine, the information including textual content associated with the selected nodes, and the information identifying the adjusted score associated with the selected nodes.

19 Claims, 6 Drawing Sheets

(56) References Cited

U.S. PATENT DOCUMENTS

| | | | |
|---|---|---|---|
| 7,979,454 B2* | 7/2011 | Tsunokawa | 707/758 |
| 8,082,497 B2* | 12/2011 | Salesin et al. | 715/255 |
| 8,121,895 B2* | 2/2012 | Lynn | 705/14.4 |
| 8,185,576 B2* | 5/2012 | Rose | 709/203 |
| 8,204,878 B2* | 6/2012 | Amer-Yahia et al. | 707/723 |
| 8,214,762 B2* | 7/2012 | Pai | 715/811 |
| 8,260,789 B2* | 9/2012 | Dumais et al. | 707/748 |
| 8,326,866 B1* | 12/2012 | Upstill et al. | 707/769 |
| 8,346,792 B1 | 1/2013 | Baker et al. | |
| 8,370,330 B2* | 2/2013 | Priyadarshan et al. | 707/722 |
| 8,375,024 B2* | 2/2013 | Goeldi | 707/722 |
| 8,386,454 B2* | 2/2013 | Haas et al. | 707/706 |
| 8,386,482 B2* | 2/2013 | Gopalakrishnan | 707/732 |
| 8,392,435 B1* | 3/2013 | Yamauchi | 707/749 |
| 8,407,290 B2* | 3/2013 | Abt et al. | 709/205 |
| 8,417,721 B1* | 4/2013 | Upstill et al. | 707/769 |
| 8,484,179 B2* | 7/2013 | Tran et al. | 707/706 |
| 8,484,188 B1* | 7/2013 | Upstill et al. | 707/706 |
| 8,504,550 B2* | 8/2013 | Hall et al. | 707/710 |
| 8,527,538 B1* | 9/2013 | Upstill et al. | 707/769 |
| 8,539,331 B2* | 9/2013 | Pettit et al. | 715/206 |
| 8,549,086 B2* | 10/2013 | Loofbourrow | 709/206 |
| 8,554,854 B2* | 10/2013 | Benyamin et al. | 709/206 |
| 8,577,610 B2* | 11/2013 | Shao et al. | 701/537 |
| 8,583,725 B2* | 11/2013 | Gibson | 709/203 |
| 8,589,407 B2* | 11/2013 | Bhatia | 707/748 |
| 8,589,516 B2* | 11/2013 | Wheeler et al. | 709/219 |
| 8,606,769 B1* | 12/2013 | Berry | 707/706 |
| 8,612,293 B2* | 12/2013 | Benyamin et al. | 705/14.54 |
| 8,615,434 B2* | 12/2013 | Benyamin et al. | 705/14.54 |
| 8,620,951 B1* | 12/2013 | He et al. | 707/769 |
| 8,626,681 B1* | 1/2014 | Jurca et al. | 706/12 |
| 8,640,021 B2* | 1/2014 | Perez et al. | 715/203 |
| 8,645,469 B2* | 2/2014 | Chi et al. | 709/205 |
| 8,655,883 B1* | 2/2014 | Yuksel | 707/737 |
| 8,660,602 B2* | 2/2014 | Akhtar et al. | 455/550.1 |
| 8,661,328 B2* | 2/2014 | Barak et al. | 715/206 |
| 8,688,688 B1* | 4/2014 | Murphy et al. | 707/714 |
| 8,700,398 B2* | 4/2014 | Marcus et al. | 704/240 |
| 8,751,520 B1* | 6/2014 | Bhattacharjee et al. | 707/767 |
| 8,751,588 B2* | 6/2014 | Loofbourrow | 709/206 |
| 8,762,392 B1* | 6/2014 | Yamauchi | 707/749 |
| 8,768,767 B2* | 7/2014 | Lynn | 705/14.47 |
| 8,775,518 B2* | 7/2014 | Limpaecher et al. | 709/204 |
| 8,781,811 B1* | 7/2014 | Buryak et al. | 704/8 |
| 8,788,927 B2* | 7/2014 | Gleadall et al. | 715/208 |
| 8,799,798 B2* | 8/2014 | Ito | 715/764 |
| 8,806,325 B2* | 8/2014 | Decker et al. | 715/230 |
| 8,812,494 B2* | 8/2014 | Priyadershan et al. | 707/722 |
| 8,812,631 B2* | 8/2014 | Buendgen | 709/220 |
| 8,812,632 B2* | 8/2014 | Buendgen | 709/220 |
| 8,818,049 B2* | 8/2014 | Wren et al. | 382/115 |
| 8,831,969 B1* | 9/2014 | Guo et al. | 705/7.29 |
| 2002/0095459 A1* | 7/2002 | Laux et al. | 709/203 |
| 2002/0178264 A1* | 11/2002 | Benda et al. | 709/227 |
| 2003/0229845 A1* | 12/2003 | Salesin et al. | 715/500 |
| 2004/0054654 A1* | 3/2004 | Nomiyama et al. | 707/1 |
| 2005/0102628 A1* | 5/2005 | Salesin et al. | 715/764 |
| 2005/0165781 A1 | 7/2005 | Kraft et al. | |
| 2005/0177560 A1 | 8/2005 | Morioka | |
| 2006/0010375 A1* | 1/2006 | Salesin et al. | 715/517 |
| 2006/0026496 A1 | 2/2006 | Joshi et al. | |
| 2006/0070004 A1 | 3/2006 | Miller et al. | |
| 2006/0294065 A1* | 12/2006 | Dettinger et al. | 707/3 |
| 2007/0016579 A1 | 1/2007 | Kaul et al. | |
| 2007/0073665 A1* | 3/2007 | Naganuma et al. | 707/3 |
| 2007/0214116 A1 | 9/2007 | Liu et al. | |
| 2008/0082662 A1 | 4/2008 | Dandliker et al. | |
| 2008/0104113 A1 | 5/2008 | Wong et al. | |
| 2008/0215563 A1* | 9/2008 | Shi et al. | 707/5 |
| 2008/0222140 A1 | 9/2008 | Lagad et al. | |
| 2008/0295005 A1* | 11/2008 | Salesin et al. | 715/763 |
| 2009/0006388 A1* | 1/2009 | Ives et al. | 707/5 |
| 2009/0012946 A1* | 1/2009 | Tsunokawa | 707/3 |
| 2009/0063538 A1 | 3/2009 | Chitrapura et al. | |
| 2009/0204638 A1 | 8/2009 | Hollier et al. | |
| 2009/0216724 A1 | 8/2009 | Cai et al. | |
| 2009/0240680 A1 | 9/2009 | Tankovich et al. | |
| 2009/0287997 A1* | 11/2009 | Gordon et al. | 715/249 |
| 2009/0327338 A1 | 12/2009 | Zhao et al. | |
| 2010/0049709 A1 | 2/2010 | Ravikumar et al. | |
| 2010/0049762 A1 | 2/2010 | Cui et al. | |
| 2010/0145975 A1* | 6/2010 | Ratiner et al. | 707/765 |
| 2010/0153377 A1* | 6/2010 | Rajan et al. | 707/723 |
| 2010/0268701 A1 | 10/2010 | Zhang et al. | |
| 2011/0013569 A1* | 1/2011 | Scherzer et al. | 370/329 |
| 2012/0047131 A1 | 2/2012 | Billawala et al. | |
| 2013/0275577 A1* | 10/2013 | Lim | 709/224 |
| 2013/0275859 A1* | 10/2013 | O'Brien-Strain et al. | 715/234 |
| 2013/0275889 A1* | 10/2013 | O'Brien-Strain et al. | 715/760 |

OTHER PUBLICATIONS

Written Opinion of the International Searching Authority issued in PCT/CN2010/000454 on Jan. 20, 2011, 4 pages.
International Preliminary Report on Patentability for PCT/CN2010/000454 issued Oct. 9, 2012, 5 pages.
"The Title Tag—Most Important SEO Factor?;" http://www.natebal.com/2011/01/title-tag-important-seo-factor/; Jan. 4, 2011; 5 pages.
"Title Tag SEO Best Practices," http://www.seomoz.org/learn-seo/title-tag; retrieved Mar. 2011; 7 pages.
Lee et al., "Automatic Identification of User Goals in Web Search," WWW 2005, May 10-14, 2005, Chiba, Japan, 10 pages.
Broder, Andrei, "A Taxonomy of Web Search," ACM SIGIR Forum, vol. 36, No. 2, Fall 2002, pp. 3-10.
Jansen, B.J., et al, "Determining the Informational, Navigational, and Transactional Intent of Web Queries," *Information Processing and Management* 44 (2008) 1251-1266.
Kraft, R., and Zien, J., "Mining Anchor Text for Query Refinement," WWW2004, May 17-22, 2004, pp. 666-674.
Lu, Y., et al, "Coupling Feature Selection and Machine Learning Methods for Navigational Query Identification," CIKM'06, Nov. 5-11, 2006, pp. 682-689.
Reed, Frank, 'Google's SiteLinks Program Very Good . . . For Google,' reprinted from http://www.marketingpilgrim.com/2010/03/google%E2%80%99s-sitelinks-program-very-good-%E2%80%A6-for-google.html, on Feb. 16, 2011, 3 pages.
"SiteLinks—Webmaster Tools Help," Google Webmaster Central, updated Oct. 9, 2010, reprinted from http://www.google.com/support/webmasters/bin/answer.py?hl=en&answer=47334, 1 page.
Zhu, H., et al, "Navigating the Intranet with High Precision," WWW 2007, May 8-12, 2007, pp. 491-500.
Zhu, H., et al, "Navigating the Intranet with High Precision," IBM Research Center, WWW'07 Proceedings of the 16th International Conference on the World Wide Web, ACM New York, 2007, pp. 491-500.

* cited by examiner

DETECTION OF BOILERPLATE CONTENT

CROSS-REFERENCE TO RELATED APPLICATION

This application is a continuation of PCT/CN2010/000454, filed Apr. 7, 2010, which is incorporated herein by reference.

BACKGROUND

This specification relates to the detection of boilerplate content.

Web browsers use resources such as HyperText Markup Language (HTML) or eXtensible Markup Language (XML) documents to generate and display formatted content. A single such resource may include different content elements that discuss (or are otherwise associated with) different topics. For instance, a first block-level element of an HTML document may include textual content that discusses the primary topic of the document, while a second block-level element of the same HTML document may include advertising content, navigation-related content, disclaimer-type content, or other content that is of a different topic than the primary topic.

Query recommendation engines apply various query recommendation techniques to resources in order to identify and suggest other resources that might be of interest to a user. One example query recommendation technique is illustrated in and described in reference to FIG. 4 of PCT App. No. PCT/CN2009/000875, filed Aug. 4, 2009, and titled "Query Suggestions From Documents," the substance of which is incorporated herein by reference. In another example of a query recommendation technique, a query recommendation engine may parse the text from a resource, apply stop word filtering, and identify a likely topic associated with frequently occurring words. Furthermore, the query recommendation engine may reference a look-up table to identify resources associated with the identified topic, and may provide information that identifies the resources to a client device, for presentation to a user.

When the user views a web page that discusses a particular topic, the query recommendation engine may determine that many other users who were interested in that topic also visited another, different web page, and typically spent a long amount of time viewing that different web page. Responsive to this determination, the query recommendation engine may suggest that the user visit the different web page, or that the user execute a search query using query terms that produce search results that link to the different web page. This specification refers to both of these types of suggestions as "query recommendations."

When a resource includes multiple content elements that are each associated with a different topic, the resulting query recommendations generated by the search engine are less likely to be focused on the particular topic in which the user is most interested, and may therefore be unhelpful. For instance, a resource may include a navigation bar, and textual content that discusses a primary topic. If the navigation bar is used as the basis for a query recommendation, the user may be presented with query recommendations that relate to navigation between web pages (e.g., the terms "home," "contact us," "sign up," "log in," etc.), instead of query recommendations that relate to the primary topic. Thus, unless the search engine is able to identify and select the content elements of the resource which discuss the primary topic from among all of the content elements of the resource, and unless the search engine is able to apply the query recommendation techniques to these selected content elements in particular, the resulting query recommendation is unlikely to be considered helpful to the user.

One approach to focusing query recommendations involves filtering "boilerplate content" from a resource prior to applying a query recommendation technique. Boilerplate content is the content of a resource that is repeated in, or is common to, multiple resources or all resources of a particular web site, or portions of a resource which is not relevant to the main content of the resource. Specific examples of boilerplate content may include disclaimer or license information, navigation panels, copyright information, footer data, or promotional links. By filtering the boilerplate content of a resource before applying a query recommendation technique to the resource, the results of the query recommendation are more likely to be focused on the particular topic in which the user is most interested.

The detection of boilerplate content may occur at the server side, for example by a search engine that indexes most or all of the web pages of a particular web site. Because the boilerplate content may show up in a fixed area of all of the web pages of a particular web site, a search engine may compare the Document Object Model (DOM) tree of the indexed web pages of the web site to identify content elements that are common to many or all web pages of the web site, or that occur at the same or similar DOM tree node. Once identified as boilerplate content, these content elements may then be removed or demoted in the index of the search engine.

SUMMARY

In general, one innovative aspect of the subject matter described in this specification can be embodied in methods that includes the action of traversing a DOM tree associated with a resource by an application executing on a client device. The nodes of the DOM tree are scored based on the extent to which each corresponding node exhibits certain, predefined characteristics that are characteristic of generic content or boilerplate content. Information identifying the nodes and the respective scores associated with each node are provided to a query recommendation engine to allow the engine to generate a focused query recommendation. Other embodiments of this aspect include corresponding systems, apparatus, and computer programs recorded on computer storage devices, each configured to perform the actions of the methods.

In general, another innovative aspect of the subject matter described in this specification can be embodied in methods performed by a client device, such as performed by a toolbar, browser, or browser extension or plug-in running on the client device, where the methods include the actions of selecting one or more nodes of an object model that models a resource as a hierarchy of nodes, determining that the selected nodes exhibit one or more predefined traits that are characteristic of boilerplate content, where boilerplate content includes content that is repeated in multiple resources of a particular web site, adjusting a score associated with the selected nodes responsive to determining that the selected nodes exhibit the predefined traits, and providing information to a query recommendation engine, the information including textual content associated with the selected nodes, and the information identifying the adjusted score associated with the selected nodes. Other embodiments of this aspect include corresponding systems, apparatus, and computer programs recorded on computer storage devices, each configured to perform the actions of the methods.

These and other embodiments can each optionally include one or more of the following features. The resource is received from a server. The object model is a Document Object Model (DOM) tree. The resource is a HyperText Markup Language (HTML) document or an eXtensible Markup Language (XML) document. Adjusting the score further includes incrementing or decrementing the score based on determining that the selected nodes exhibit the predefined traits. The actions further include determining that the score satisfies a predetermined threshold, and providing information to a query recommendation engine responsive to determining that the score satisfies the predetermined threshold, the information identifying the textual content as boilerplate content. When the boilerplate content is an anchor block, determining that the selected nodes exhibit the predefined traits further includes determining that the selected nodes are associated with a division-type, table-type, or list-type block-level element, determining that the selected nodes define a shape that includes fewer than a predetermined quantity of pixels, determining that the selected nodes define a shape that exhibits a height-to-width ratio or a width-to-height ratio that is greater than a predetermined value, determining that the selected nodes include at least a predetermined quantity of element objects as child nodes, and/or determining that greater than a predetermined percentage of textual content associated with the selected nodes occurs within one or more link elements. When the boilerplate content is an anchor list, determining that the selected nodes exhibit the predefined traits further includes determining that the selected nodes include at least a predetermined quantity of anchor objects as child nodes, and/or determining that two or more anchor objects associated with the selected nodes are left aligned with each other. When the boilerplate content is a footer, determining that the selected nodes exhibit the predefined traits may includes determining that the selected nodes define a shape that occurs at a bottom of a web page, and/or determining that the selected nodes include a body element as a parent node. The actions of each embodiment also include copying, during each of two or more time slices, different portions of the object model until a complete copy of the object model is obtained, where selecting the nodes of the object model may further include selecting the nodes from the copy of the object model using a background thread.

Particular embodiments of the subject matter described in this specification can be implemented to realize one or more of the following advantages. Specifically, client side boilerplate content detection can accurately detect boilerplate content without having to access a large number of web pages of a particular web site.

The details of one or more embodiments of the subject matter described in this specification are set forth in the accompanying drawings and the description, below. Other features, aspects and advantages of the subject matter will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
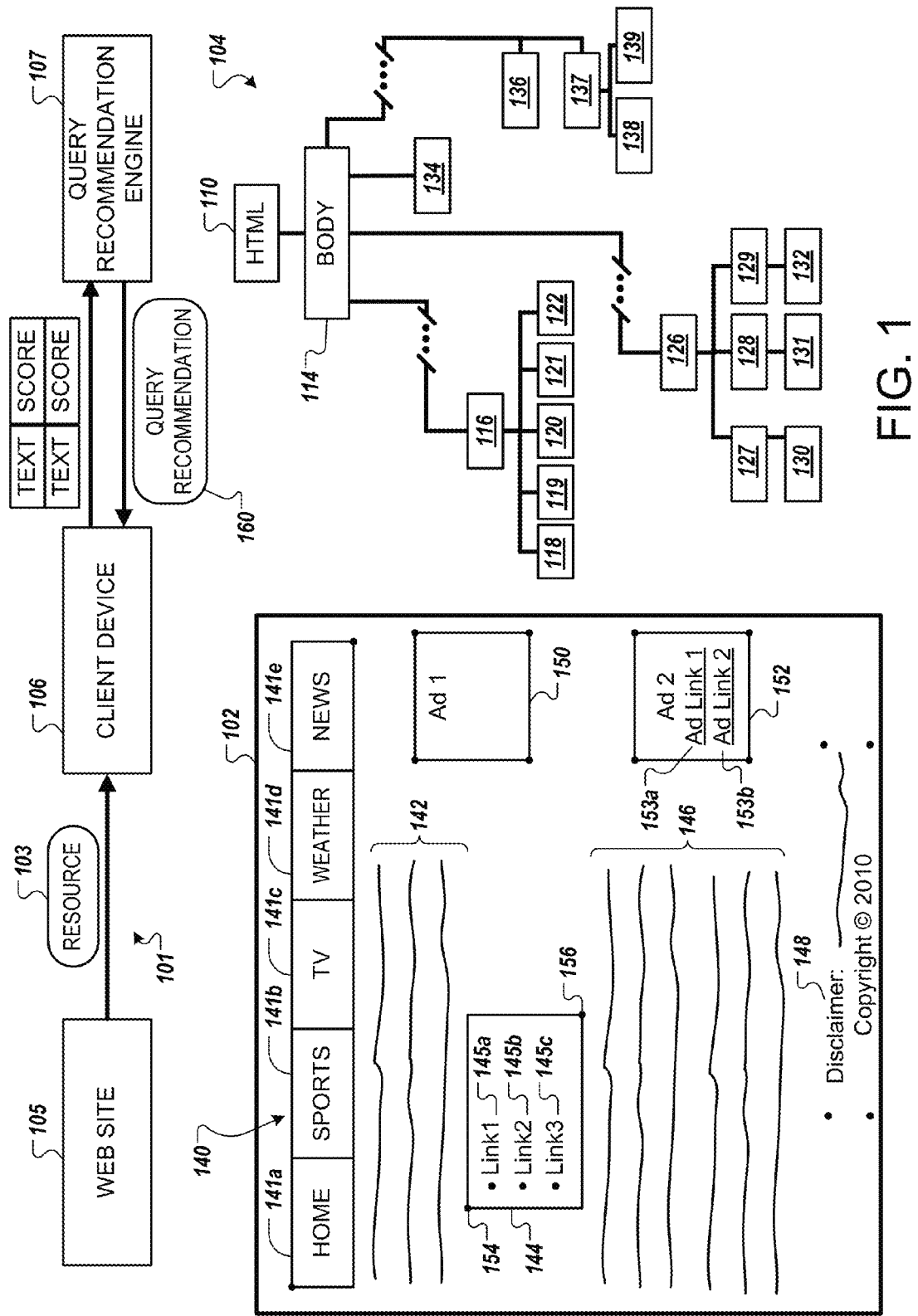
FIG. 1 illustrates a system, an example web page that is generated from a resource, and a simplified DOM tree associated with the web page and the resource.

FIG. 1 illustrates a system 101, an example web page 102 that is generated from a resource 103, and a simplified DOM tree 104 associated with the web page 102 and the resource 103. The system 101 includes a web site 105, a client device 106, and a query recommendation engine 107.

The DOM is a platform- and language-neutral application programming interface (API) that allows programs and scripts to dynamically access and update the content of the resource 103, which may be an HTML or XML document. A web browser executing on the client device 106 uses a layout engine to build a structured object model (i.e., the DOM tree 104) for the resource 103, and an application or program may traverse the model to access or manipulate the content of a local copy of the resource 103. The DOM models the resource 103 as a hierarchy of nodes that represent objects that each have a unique identity and, in some cases, specialized functionality. The DOM tree 104 includes, among other nodes, nodes 110-139. Some nodes (e.g., nodes 110, 114, 116, 126-129, 137) of the model have child nodes of various types, and other nodes (e.g., nodes 118-122, 130-134, 136, 138, 139) are leaf nodes that do not have other nodes below them in the hierarchy.

In FIG. 1, the client device 106 receives the resource 103 from the web site 105 in response to a hypertext transfer protocol (HTTP) request. A layout engine (e.g., the MICROSOFT TRIDENT, or MICROSOFT HyperText Markup Language (MSHTML) layout engine) executing on the client device 106 models the resource 103 as the DOM tree 104, to include a hierarchy of nodes. Nodes 110 to 139 of the DOM tree 104 are element nodes that each correspond to an HTML element, where each element node represents an object that includes functionality that depends on a corresponding element defined in the resource 103. An element node may include attributes, and may have other element nodes, text nodes or other types of nodes as child nodes.

For a particular HTML element, HTML attributes are exposed as properties of the object that models the element. An HTML anchor or area element defined in an HTML document may, for example, be modeled as an object with a COORDS attribute that includes a comma-separated list of lengths that define an active region geometry, or a SHAPE attribute that specifies a shape of an active area. In additional examples, the object may include an ALIGN attribute that specifies how an object is to be vertically or horizontally aligned with respect to its surrounding text, and a CHILDNODE attribute that identifies the child nodes associated with a particular node.

Once the layout engine builds the DOM tree 104 for the resource 103, a web browser executing on the client device 106 uses the DOM tree 104 to display formatted content on a user interface, for example by 'painting' the formatted content into a content area of a window. Web page 102, which is generated from the DOM tree 104 and, by extension, the resource 103, provides an example of formatted content that is displayed in the content area of a window. The web page 102 includes, for example, a navigation bar 140, text content 142, an anchor list 144, text content 146, a footer 148, and advertisements 150 and 152.

Each of the formatted content items 140-152 displayed on the web page 102 correspond to one or more nodes of the DOM tree 104. For example, the navigation bar 140 corresponds to node 116. The navigation bar 140 includes a set of anchors 141a-141e for navigating to "home", "sports", "TV", "weather", and "news", respectively. The anchors 141a-141e correspond to child nodes 118-122, respectively. The footer 148 corresponds to node 134 and the advertisements 150 and 152 correspond to nodes 136 and 137, respectively. Ad anchors 153a and 153b included in the ad 152 correspond to child nodes 138 and 139, respectively.

The anchor list 144 includes a list of anchors (e.g., anchors 145a-145c, corresponding to "Link 1", "Link 2", and "Link 3", respectively). The anchor list 144 corresponds to node 126. Each anchor 145a-145c may be associated with a list-item content item and a corresponding list-item DOM node. For example, the anchors 145a-145c correspond to nodes 130-132, respectively, where each node 130-132 is a child of a respective parent list-item node 127-129.

The web browser uses attribute information of the nodes 110 to 139 to display the web page 102. For example, the node 116 may include an attribute value for a SHAPE attribute that indicates that the navigation bar 140 is a rectangular shape and attribute values for a COORDS attribute that specify, for example, values for upper-left and lower-right coordinates of a rectangular region occupied by the navigation bar 140. Because the final shape and coordinates are calculated by the layout engine according to the node attributes (including the SHAPE and COORDS attributes), and the width/height pixels are extracted from the layout engine, the shape or cords attributes may or may not directly determine the actual shape and coordinate characteristics of a content block As another example, the node 126 may include a CHILDNODE attribute that indicates that the list-item nodes 127-129 are child nodes of the node 126. Each of the list-item nodes 127-129 may also include a CHILDNODE attribute, indicating a respective child anchor node 130-132. The anchor nodes 130-132 may each have an ALIGN attribute indicating that the respective corresponding anchors 145a-145c are to be left aligned with respect to the anchor list 144. The node 126 corresponding to the anchor list 144 may have a SHAPE attribute that indicates that the anchor list 144 is a rectangular shape and attribute values for a COORDS attribute that specify, for example, values for upper-left and lower-right coordinates (e.g., illustrated by locations 154 and 156 on the web page 102) of a rectangular region occupied by the anchor list 144.

The boilerplate content of the web page 102 is detected when a toolbar, browser assistant, extension, plug-in, or other software module or application on the client device 106 invokes a boilerplate content detection process, for example when the user or an application initiates a process for generating a query recommendation. Once boilerplate content is detected, it may be filtered or otherwise excluded before query recommendation techniques are applied to the resource 103, so that topics associated with the boilerplate content are not used as a basis for the query recommendation.

The DOM tree 104 is traversed by the boilerplate content detection process. Various traversal approaches may be used. For example, the DOM tree 104 may be iteratively traversed in a depth-first manner, a breadth-first manner, may be traversed using recursion, or using a combination of approaches.

In some implementations, an object model other than the DOM tree 104 which is used by the layout engine is traversed, for example where the boilerplate content detection process traverses a copy of the DOM tree 104. In some implementations, a copy of the DOM tree 104 is generated, such as where a main user interface thread copies a portion of the DOM tree 104 during each of two or more time slices. A background thread may subsequently be used to process the copy of the DOM tree 104, which may, for example, allow the main user interface thread to process and be responsive to a user's interaction with the web browser, without the user perceiving a delay.

During traversal of the DOM tree 104, one or more nodes of the DOM tree 104 are selected. For example, one node may be selected at a time. As another example, a group of two or more nodes may be selected at a time. A group of selected nodes may include, for example, a node and its sibling nodes, a node and its child nodes that are leaf nodes, a node and all of its child nodes, or a node and all descendants of the node. Node selection and traversal may continue in a depth-first fashion (e.g., processing a node and its descendants until one or more leaf nodes are reached) or a breadth-first fashion (e.g., processing a node and its sibling nodes before processing descendants of the node and its sibling nodes). Nodes of a certain type (e.g., text nodes, element nodes) may be selected and other types of nodes (e.g., comment nodes, or Processing Instruction nodes) may be excluded from selection or otherwise ignored.

The selected nodes are analyzed to determine whether they exhibit certain predefined traits that are characteristic of boilerplate content, or the extent to which the predefined traits are exhibited. The traits may include size traits, shape traits, hierarchical traits, or other traits. A hierarchical trait relates to whether a particular node has child nodes, the quantity of child nodes, the type of parent or child nodes, or other characteristics relating to the relationship of a particular node to other nodes, within the object model. The types of boilerplate content that can be detected using DOM tree analysis may include, for example, anchor blocks, anchor lists, footers, and ads.

An anchor block is a rectangular region of the web page that includes multiple anchors. Examples of anchor blocks include navigation panels or bars (e.g., navigation bar 140 of web page 102), ad blocks, or regions of a web page that include links to related articles.

Anchor blocks typically exhibit several specific anchor-block indicative traits that can be modeled by predefined criteria and applied to the selected nodes of a DOM tree. For instance, a node associated with an anchor block may (i) define a region that is associated with a block-level element (e.g., a division-type, table-type, or list-type block-level element), (ii) define a region that is usually small (e.g., no larger than four hundred by four hundred pixels), (iii) define a region that exhibits a very long but very narrow shape (e.g., height-to-width or width-to-height ratio of greater than 3:1), (iv), include two or more element objects as child nodes, and/or (v) include very little textual content other than the textual content that is associated with a link (e.g., less than 20% of the total textual content associated with the block).

The anchor-block indicative traits (i) to (v) described above may be detected by a boilerplate detection process that examines attributes of a node or a set of nodes within the DOM tree 104. The boilerplate detection process may determine the presence of anchor-block indicative traits without comparing the DOM tree 104 to another DOM tree. The anchor-block indicative traits may be detected in a single resource (e.g., resource 103) from the web site 105 without acquiring multiple resources. Further, the boilerplate detection process may be performed without examining the substance of textual content included in the resource 103. For example, the boilerplate detection process may identify boilerplate content regardless of the language of the textual content included in the resource 103 (e.g., boilerplate content may be detected regardless of whether the textual content included in the resource 103 is in English or Chinese).

The presence of anchor-block indicative traits may be determined, for example, by executing predefined tests that may be implemented as a series of functions that obtain the attribute values of a selected node or group of nodes, compare the obtained attribute values to predetermined values or thresholds, and determine whether the node exhibits anchor-block indicative traits (or the extent to which it exhibits anchor-block indicative traits). For example, a likelihood score may be computed for the selected nodes, where the likelihood score indicates how likely it is that the node is associated with anchor-block content. For example, a likelihood score may begin at zero and may be, for example, incremented according to the degree to which the node or set of nodes match an anchor-block indicative trait.

In general, an anchor block may be detected if one of the anchor-block indicative traits is present, if more than one of the anchor-block indicative traits is present, or if all of the anchor-block indicative traits are present. Furthermore, an anchor block may be determined to not be present even if one or more of the anchor-block indicative traits are present to a limited extent, but an anchor block may be determined to be present if the anchor-block indicative traits are present to a greater extent.

For example, navigation bar 140 of the web page 102 is one example of an anchor block and a set of tests may be performed on the associated nodes 116-122. The nodes 116-122 may satisfy some but not all of the anchor-block indicative traits described above. For example, the node 116 includes five child element objects (e.g., the nodes 118-122 corresponding to the anchors 141a-141e) and therefore exhibits the anchor-block indicative trait of (iv) including two or more element objects as child nodes. Consequently, an anchor-block likelihood score for the nodes 116-122 may be incremented by a particular amount (e.g., twenty out of a possible increment of twenty). If the navigation bar 140 had exhibited the trait (iv) by a lesser amount (e.g., suppose the navigation bar 140 had two child elements), the anchor-block likelihood score for the nodes 116-122 may have been incremented by a lesser amount (e.g., fifteen).

All of the textual content of the navigation bar 140 is associated with the anchors 141a-141e, and therefore the corresponding nodes 116-122 has the anchor-block indicative trait (v) of including very little textual content other than the textual content associated with a link. Consequently, an anchor-block likelihood score for the nodes 116-122 may be incremented by a particular amount (e.g., twenty out of a possible increment of twenty, for an accumulated likelihood score of forty).

The navigation bar 104 and corresponding nodes 116-122 appear to satisfy the anchor-block indicative trait (i) of defining a region that is associated with a block-level element, and consequently an anchor-block likelihood score for the nodes 116-122 may be incremented by a particular amount (e.g., twenty out of a possible increment of twenty, for an accumulated likelihood score of sixty). The navigation bar 140 appears to have a width-to-height ratio greater than 3:1 and therefore the corresponding nodes 116-122 satisfy the anchor-block indicative trait (iii) of defining a region that exhibits a very long but very narrow shape. Consequently, an anchor-block likelihood score for the nodes 116-122 may be incremented by a particular amount (e.g., twenty out of a possible increment of twenty, for an accumulated likelihood score of eighty).

Because the navigation bar 140 occupies the width of the web page 102 it appears to be wider than four hundred pixels, and thus the nodes 116-122 appear to not satisfy the anchor-block indicative trait (ii) of defining a small region that is not larger than 400×400 pixels. Consequently, an anchor-block likelihood score for the nodes 116-122 may not be incremented based on the anchor-block indicative trait (ii), or the likelihood score may be incremented by a lesser amount (e.g., the likelihood score may be incremented by an amount of five out of a possible increment of twenty, because the height of the navigation bar 140 appears to be much less than four hundred pixels).

Supposing that the anchor-block likelihood score for the nodes 116-122 is incremented by a value of five, a final anchor-block likelihood score would then be eighty five. The final anchor-block likelihood score for the nodes 116-122 indicates the likelihood that the nodes 116-122 are associated with anchor block content, and may be compared to a threshold value (e.g., eighty). In general, the boilerplate detection process may determine that the node or set of nodes is an anchor block if the final likelihood score for the node or set of nodes exceeds the threshold. As discussed in more detail below, likelihood scores may be given to a query recommendation engine.

Multiple sets of tests may be performed for a node or set of nodes, where each set of tests corresponds to a type of boilerplate content. For example, a set of tests may be performed as described above for a node or set of nodes to determine whether the node or set of nodes is an anchor block. A second set of tests may be performed to determine whether the node or set of nodes is another type of boilerplate content, such as an anchor list. Other sets of tests may be performed for other boilerplate content types, such as footers, or advertisements. For each node or set of nodes, a likelihood score may be determined for each boilerplate content type. A node or set of nodes may have one, more than one, or zero likelihood scores that exceed associated threshold values. In other words, based on performed tests, a node or set of nodes may appear to be zero, one, or more than one type of boilerplate content. For a node or set of nodes, a highest likelihood score may be identified to determine a most likely type of boilerplate content.

For a particular node or set of nodes, some or all tests may be performed. For example, if a node or set of nodes receives a likelihood score exceeding a threshold for a particular boilerplate content type, tests for other boilerplate content types might not be performed (e.g., it may be determined that the node or set of nodes has been sufficiently identified as boilerplate content). As another example, if a node or set of nodes fails one or more tests, other tests may not be performed. For example, if a node has no child nodes, the process may decide not to perform other tests.

Another type of boilerplate content is the anchor list. An anchor list is a type of boilerplate content that includes a series of consecutive anchors that appear inside another element, such as the main content of a resource 103. Anchor lists typically exhibit several specific anchor-list indicative traits that can be modeled by predefined criteria and applied to the selected nodes of the DOM tree. For instance, a node or set of nodes associated with an anchor list may (i) include anchor objects that are left-aligned with each other (e.g., an ALIGN attribute value of "left"), and/or (ii) include three or more anchor objects as child nodes.

As another example, consider anchor-list detection performed for the nodes 126-132 corresponding to the anchor list 144 of the web page 102. The anchor list 144 includes three left-aligned anchors 145a-145c and therefore the nodes 126-132 appear to satisfy both anchor-list indicative traits (i) and (ii) described above. Consequently, an anchor-list likelihood score may be incremented by amounts of fifty and fifty, respectively, for a final anchor-list likelihood score of one hundred out of a possible one hundred for the nodes 126-132, that may exceed a threshold and therefore indicate that the nodes 126-132 associated with the anchor list 144 are indeed detected as associated with anchor list content.

Another type of boilerplate content is footer content. A footer is one or more lines of text that appear at the bottom of many or all web pages associated with a particular web site. A footer may include, for example, disclaimer or copyright information. Footers typically exhibit several specific footer-indicative traits that can be modeled by predefined criteria and applied to the selected nodes of a DOM tree. For instance, a node or set of nodes associated with a footer may (i) appear at the very bottom of the web page (e.g., the node may be anchored to the bottom of the web page, as reflected in a coordinate or one or more other attributes of the node), and/or (ii) may include a body element as a parent node.

For example, footer 148 of the web page 102 is one example of footer content. Suppose that footer detection tests are performed for the node 134 corresponding to the footer 148. The node 134 has the body node 114 as a parent node and therefore the node 134 exhibits the footer-indicative trait (ii) of including a body element as a parent node. Consequently, a footer likelihood score for the node 134 may be incremented by a particular amount (e.g., fifty out of a possible increment of fifty). The footer 148 and the corresponding node 134 appear to satisfy the footer-indicative trait (i) of appearing at the very bottom of the web page, and therefore the footer likelihood score for the node 134 may be incremented by a particular amount (e.g., fifty out of a possible increment of fifty, for a final footer likelihood score of one hundred). The final footer likelihood score of one hundred may exceed a threshold, indicating that the node 134 is associated with footer content.

Another type of boilerplate content is ad content. Ads typically exhibit several specific ad-indicative traits that can be modeled by predefined criteria and applied to the selected nodes of a DOM tree. For instance, a node or set of nodes associated with an ad may (i) have the same target host name as other ads in a same ad group, (ii) have an embedded URL (Uniform Resource Locator) included in the URL associated with each anchor included in the ad, (iii) have an embedded URL in each URL referenced in script code associated with the ad, (iv) have most or all (e.g., 80% or more) anchor URLs referring to out-of-domain (e.g., referring to a domain other than the domain of the resource that includes the ad) resources, and/or (v) match a predefined URL pattern associated with well known ad systems (e.g., GOOGLE ADSENSE).

An ad may be detected if one of the ad-indicative traits are present (e.g., if trait (v) above is present), if more than one of the ad-indicative traits are present, or if all of the ad-indicative traits are present. Furthermore, an ad may not be detected if one or more of the ad-indicative traits are present to a limited extent, but an ad may be detected if the ad-indicative traits are exhibited to a greater extent. For example, suppose that ad-detection tests are performed for the nodes 137-139 corresponding to the ad 152 and the associated ad anchors 153*a*-153*b*. If the ad 152 and the ad 150 have a same target host name, an ad likelihood score for the nodes 137-139 may be incremented by a particular amount, such as twenty (e.g., due to the nodes 137-139 satisfying the ad-indicative trait (i) described above).

If the ad anchor 153*a* and the ad anchor 153*b* each include an embedded URL, the ad likelihood score for the nodes 137-139 may be incremented by a particular amount (e.g., twenty out of a possible increment of twenty, for an accumulated likelihood score of forty) due to the nodes 137-139 satisfying the ad-indicative trait (ii) of having an embedded URL included in the URL associated with each anchor included in the ad. Suppose that there is no script code associated with the ad 152. In this case, the ad likelihood score for the nodes 137-139 is not incremented based on the ad-indicative trait (iii) described above.

If the ad anchor 153*a* and the ad anchor 153*b* each refer to a domain different than the domain of the web site 105, the nodes 137-139 satisfy the ad-indicative trait (iv) of having most or all anchor URLs referring to out-of-domain resources. Consequently, the ad likelihood score for the nodes 137-139 may be incremented by a particular amount (e.g., twenty out of a possible increment of twenty, for an accumulated likelihood score of sixty). Suppose that the URL pattern of the ad link 153*a* and of the ad link 153*b* do not match a recognized URL pattern. Consequently, in this case, the ad likelihood score for the nodes 137-139 is not incremented for the ad-indicative trait (v) discussed above.

A final ad likelihood score for the nodes 137-139 may be, for example, sixty out of a possible one hundred, that may or may not exceed a threshold. If the ad likelihood score of sixty exceeds a threshold, the nodes 137-139 may be identified as ad content. As another example, the nodes 137-139 may be identified as ad content based on satisfying a majority (e.g., three out of five) of ad-indicative traits.

As described above, multiple sets of tests may be performed for a node or set of nodes, with each set of tests corresponding to a type of boilerplate content. After all tests have been performed for a node or set of nodes, a highest likelihood score may be determined from among multiple likelihood scores determined for the node or set of nodes, to identify a most probable type of boilerplate content (or to determine that the node or set of nodes do not sufficiently exhibit characteristics of any identifiable boilerplate content type).

After boilerplate detection tests have been completed for a node or set of nodes, the DOM tree 104 may be traversed, one or more other nodes may be selected, and one or more boilerplate detection tests may be performed on the selected nodes. As mentioned above, the DOM tree 104 may be traversed in a depth-first manner, a breadth-first manner, may be traversed using recursion, or using a combination of approaches.

After the boilerplate detection process has generated scores for all applicable nodes, the client device 106 may provide information to the query recommendation engine 107. The query recommendation engine 107 may use the information to demote the importance of boilerplate content, or exclude boilerplate content, when applying query recommendation techniques. The query recommendation engine 107 may be an internal module of the client device 106, or the query recommendation engine 107 may be an external entity, such as where the client device 106 provides the information to a query recommendation engine that is associated with a search engine.

The information sent to the query recommendation 107 may include data (e.g., a list, a table, or another data structure) that identifies the resource, and that identifies nodes and a likelihood score associated with each node. The information may include data that identifies only those nodes whose likelihood scores exceed a predetermined threshold, and the likelihood scores associated with those nodes. Alternatively, instead of identifying nodes, the information may include data that includes the textual content associated with each node, so that the query recommendation engine 107 does not have to look up and obtain the textual content. The query recommendation engine 107 may use these likelihood scores to demote the importance of the nodes (or the textual content associated with the nodes) in applying a query recommendation technique.

The information may identify only those nodes that the client device 106 determines to be associated with boilerplate content, without identifying the likelihood score associated with each respective node. Even without the likelihood score, the query recommendation engine 107 may demote the importance of the identified nodes (or the textual content associated with the nodes) in applying a query recommendation technique.

The query recommendation engine 107 generates a query recommendation 160 and sends the query recommendation 160 to the client device 106. For example, the query recommendation engine 107 may parse the textual data associated with a node, apply stop word filtering, determine a likely topic associated with frequently occurring words, identify, from an index of resources, resources associated with the determined topic, and provide a list of URLs to the client device 106, e.g., for presentation to the user. For example, URLs related to the topic of the web page 102 may be displayed in an area of the web page 102.

Figure 2:
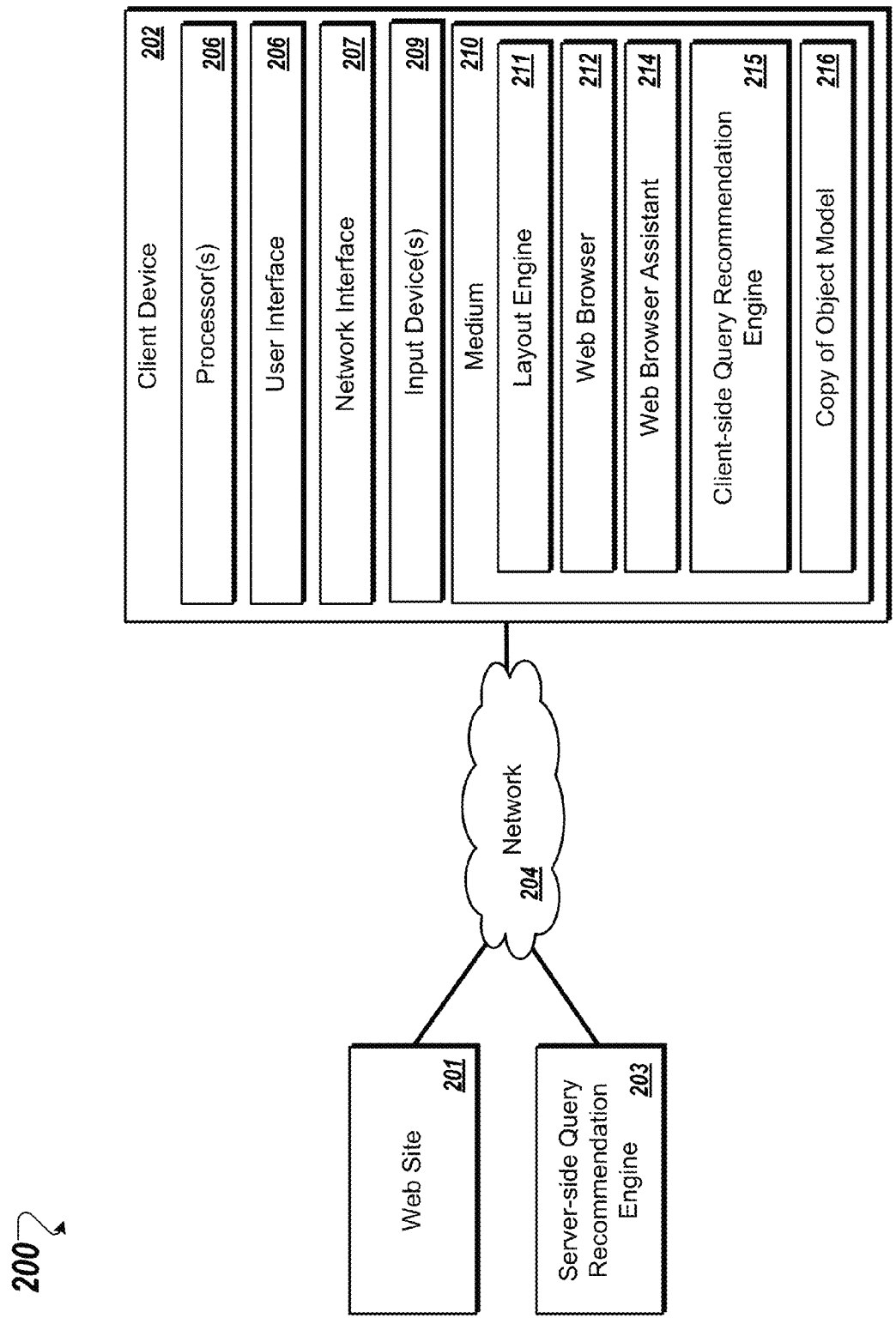
FIG. 2 depicts an example system, including a web site, a client device, and a query recommendation, connected by way of a network.

FIG. 2 depicts an example system 200, including a web site 201, a client device 202, and a server-side query recommendation engine 203, connected by way of a network 204. The network may be a private network (e.g., a corporate intranet) or a public network (e.g., the Internet), or some combination thereof.

The client device 202 includes one or more processors 205, a user interface 206, a network interface 207, one or more input devices 209, and a computer-readable storage medium 210. The computer-readable storage medium 210 includes a layout engine 211, a web browser 212, a web browser assistant 214 (referred to by this specification as a "toolbar"), a client-side query recommendation engine 215, and a copy of the object model 216.

The user interface 206 may be a display that outputs textual or graphical data to the user. The one or more processors 205 process operating system or application program computer instructions for the client device 202. The one or more input devices 209 may include, for example, a mouse, a keyboard, a joystick, a trackball, a touch-pad, a camera, a voice input device, a touch screen device implemented in combination with the user interface 206, or any other appropriate input device. The network interface 207 enables the client device 202 to communicate with the web site 201 and the server-side query recommendation engine 203 over one or more wired or wireless networks, such as the Internet.

The client device 202 may receive a resource (e.g., an HTML document) from the web site 201 in response to an HTTP request. The web browser 212 may use the layout engine 211 to build a structured object model (e.g., a DOM tree) for the received resource. The copy of the object model 216 may be created by copying the object model built by the layout engine 211.

The web browser assistant 214 may invoke a boilerplate content detection process, for example when the user or the web browser assistant 214 initiates a request to generate a query recommendation. The copy of the object model 216 may be traversed and nodes of the copy of the object model 216 may be scored based on the extent to which each corresponding node exhibits certain, predefined characteristics that are characteristic of boilerplate content. Boilerplate content may be filtered or otherwise excluded before the client-side query recommendation engine 215 or server-side query recommendation engine 203 apply query recommendation techniques for the received resource. For example, information identifying the nodes and the respective scores associated with each node may be provided to the client-side query recommendation engine 215 or the server-side query recommendation 203 to allow generation of a focused query recommendation.

In some implementations, the system 200 includes both the server-side query recommendation engine 203 that is external to the client device 202 and the client-side query recommendation engine 215 that is internal to the client device 202. In other implementations, only one of the client-side query recommendation engine 215 and the server-side query recommendation engine 203 is used.

Figure 3:
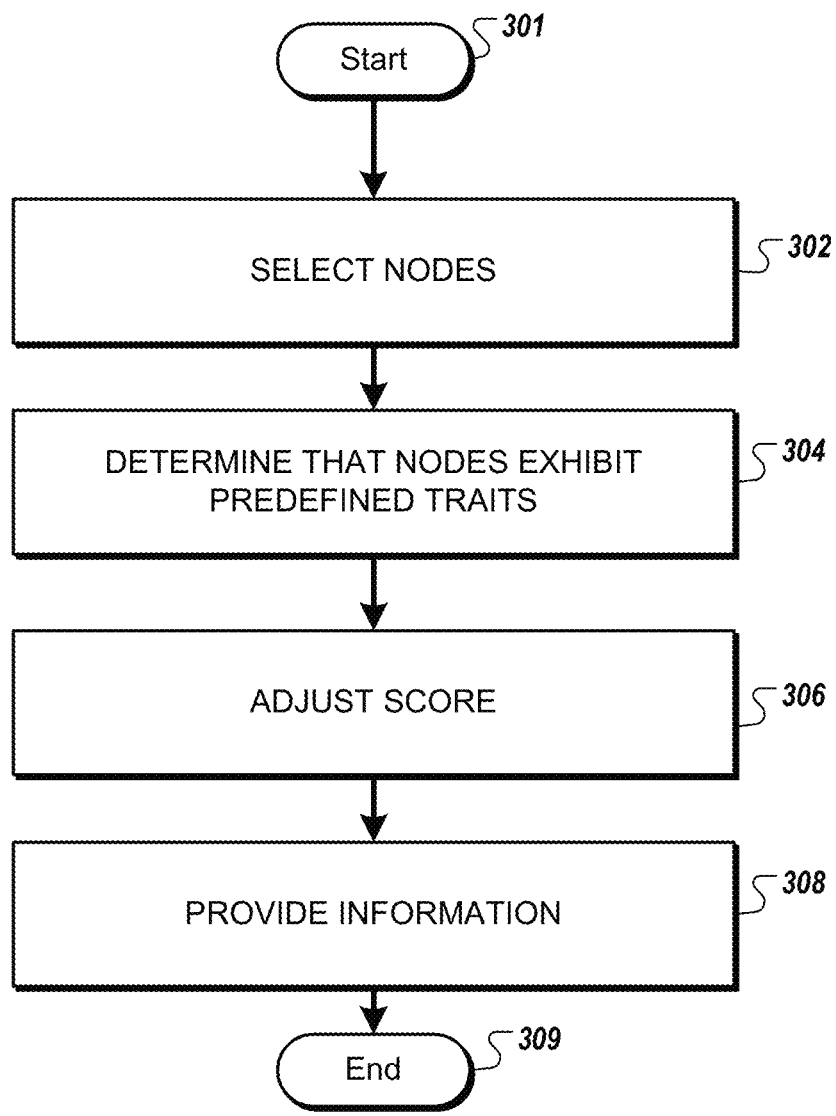
FIGS. 3 and 4 are flowcharts of example processes.

FIG. 3 is a flowchart of an example process 300. Briefly, the process 300 includes the actions of selecting one or more nodes of an object model that models a resource as a hierarchy of nodes, determining that the selected nodes exhibit one or more predefined traits that are characteristic of boilerplate content, where boilerplate content includes content that is repeated in multiple resources of a particular web site, adjusting a score associated with the selected nodes responsive to determining that the selected nodes exhibit the predefined traits, and providing information to a query recommendation engine, the information including textual content associated with the selected nodes, and the information identifying the adjusted score associated with the selected nodes. It is not necessary for a user interface to be generated by the process 300.

In further detail, when the process 300 begins (301), one or more nodes of an object model that models a resource as a hierarchy of nodes are selected (302). The object model may be a DOM tree, a copy of DOM tree, or some other type of data structure. The resource may be a HyperText Markup Language (HTML) document, an eXtensible Markup Language (XML) document, a Portable Document Format (PDF) document, or another type of document. In some implementations, different portions of the object model are copied, during each of two or more time slices, until a complete copy of the object model is obtained. Furthermore, subsequent to obtaining a complete copy of the object model, nodes may be selected from the copy of the object model using a background thread.

It is determined that the selected nodes have one or more predefined traits that are characteristic of boilerplate content (304). Specific examples of boilerplate content may include disclaimer or license information, content that exists on or is common to many or all other resources of a particular web site, navigation panels, copyright information, footer data, or promotional links.

When the boilerplate content is an anchor block, determining that the selected nodes exhibit the predefined traits may further include determining that the selected nodes are associated with a division-type, table-type, or list-type block-level element, determining that the selected nodes define a shape that includes fewer than a predetermined quantity of pixels, determining that the selected nodes define a shape that exhibits a height-to-width ratio or a width-to-height ratio that is greater than a predetermined value, determining that the selected nodes include at least a predetermined quantity of element objects as child nodes, and/or determining that greater than a predetermined percentage of textual content associated with the selected nodes occurs within one or more link elements. Detecting anchor block content may also include determining that the selected nodes exhibit other predefined traits, such as other size, shape, hierarchical, layout, or other types of traits.

When the boilerplate content is an anchor list, determining that the selected nodes exhibit the predefined traits may further include determining that the selected nodes include at least a predetermined quantity of anchor objects as child nodes, and/or determining that two or more anchor objects associated with the selected nodes are left aligned with each other. Detecting anchor list content may also include determining that the selected nodes exhibit other predefined traits, such as other size, shape, hierarchical, layout, or other types of traits.

When the boilerplate content is a footer, determining that the selected nodes exhibit the predefined traits may further include determining that the selected nodes define a shape that occurs at a bottom of a web page, and/or determining that the selected nodes include a body element as a parent node. Detecting footer content may also include determining that the selected nodes exhibit other predefined traits, such as other size, shape, hierarchical, layout, or other types of traits.

A score associated with the selected nodes is adjusted responsive to determining that the selected nodes exhibit the predefined traits (306). Adjusting the score may further include incrementing or decrementing the score based on determining that the selected nodes exhibit the predefined traits. For example, a likelihood score may begin at zero and may be, for example, incremented according to the degree that the node or set of nodes match one or more predefined traits, such as incrementing the likelihood score by a smaller amount (or not incrementing the likelihood score at all) if one or more of the traits are present to a limited extent and incrementing the likelihood score by a larger amount if one or more of the traits are present to a greater extent.

Information is provided to a query recommendation engine (308), and the process 300 ends (309). The information may include textual content associated with the selected nodes and information identifying the adjusted score associated with the selected nodes. If it is determined that the score satisfies a predetermined threshold, information may be provided to a query recommendation engine responsive to determining that the score satisfies the predetermined threshold, where the information identifies the textual content as boilerplate content.

Conventional server-side boilerplate detection requires the storage of many or all resources of a particular web site in order to analyze and compare the similarity or overlap of a particular DOM tree with other DOM trees. Using a client-side approach provided by process 300, boilerplate detection can occur through the analysis of a single DOM tree, without requiring the storage of multiple, other DOM trees from a same web site, allowing computationally expensive overlap comparison operations to be avoided.

Figure 4:
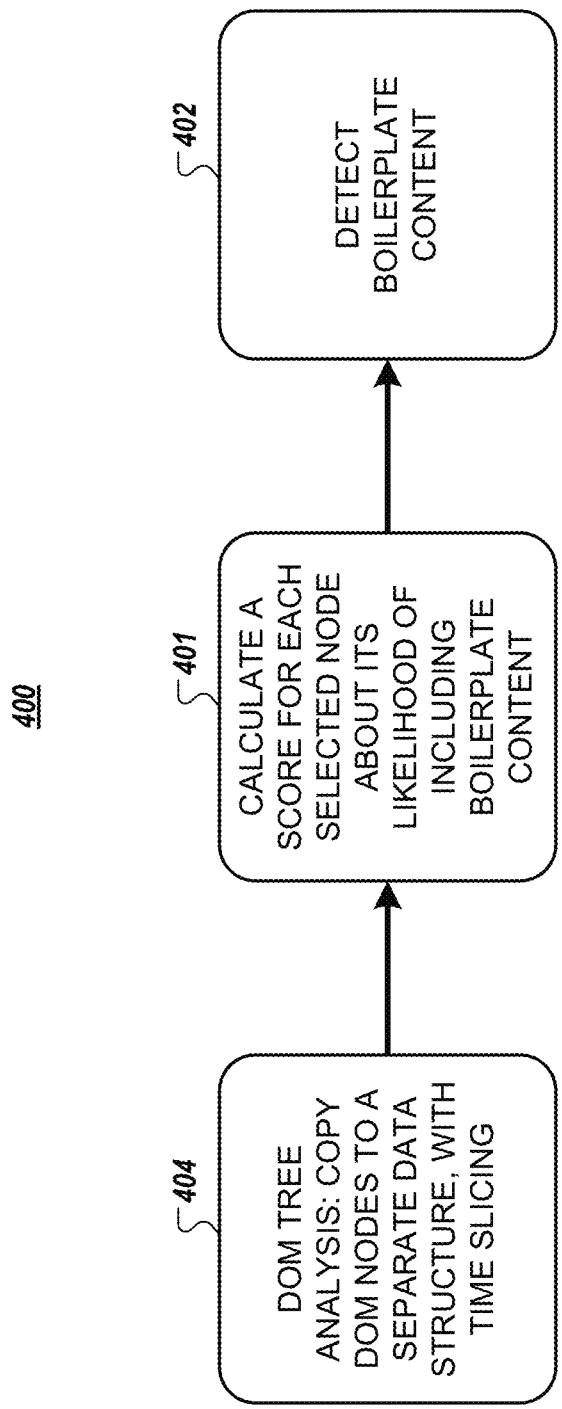

As illustrated in FIG. 4, a process 400 may include the operations of calculating a score for selected nodes (401) and executing boilerplate content detection (402) that may be preceded by a DOM tree analysis and copying operation (404). Briefly, the DOM tree analysis and copying operation (404) may include the actions of copying, during each of two or more time slices, different portions of the object model until a complete copy of the object model is obtained. Furthermore, according to the DOM tree analysis and copying operation (404), selecting the nodes of the DOM tree may further include selecting the nodes from the copy of the object model, using a background thread.

In one example implementation, a layout engine may generate a DOM tree in a main thread. Because boilerplate content detection may take a noticeable amount of processing time (e.g., ~2 seconds for large resources), the boilerplate content detection process may be performed in a background thread to avoid blocking the user interface thread. However, as MSHTML operates in a single-threaded environment, the DOM tree can only be accessed in the main thread.

Copying activities are paused in the main UI thread once the time slice is used up, and a callback method is registered. The main thread calls the callback method when the copying activities are restarted during the next time slice. The background thread is used for processing the copied content and does not implement the time slicing itself.

Thus, in another example implementation, the structure and content of the DOM tree generated by the layout engine is extracted in the main thread as a copy of the DOM tree. To avoid a noticeable freeze, time-slicing is used during the extraction process. In particular, during each time-slice, a subset (e.g., a dozen) of the nodes of the DOM tree are extracted or copied. Once the time slice is finished, the extraction stops so that the main thread can process other user inputs.

The extraction uses another time slice to continue, after pausing for a certain interval, and iterates until the entire DOM tree is copied. Using this approach, noticeable freezes are reduced. Once a copy of the DOM tree is extracted, the boilerplate content detection process is invoked in a background thread, and the boilerplate content detection process accesses the copy of the DOM tree rather than the DOM tree generated by the layout engine.

Figure 5:
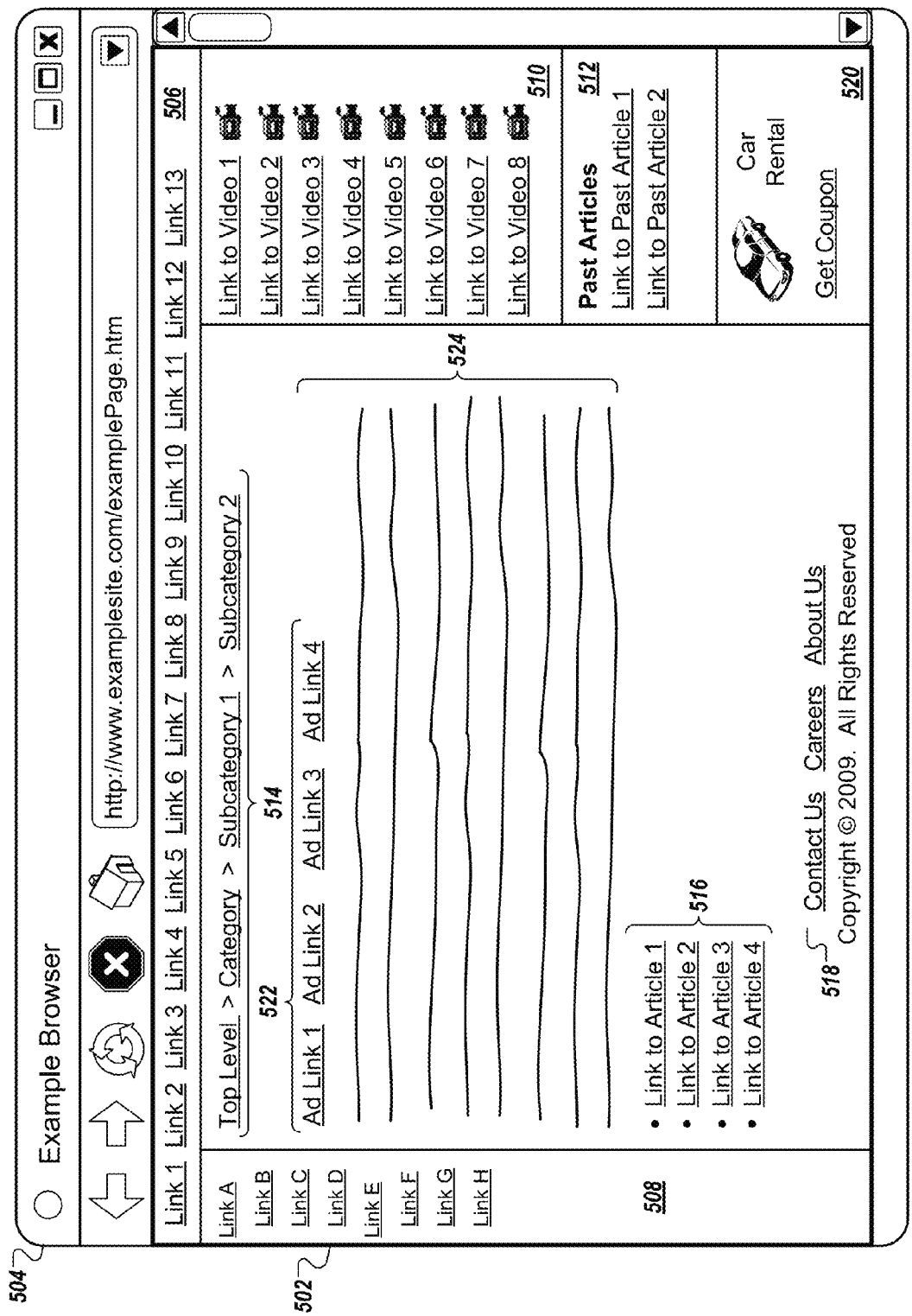
FIGS. 5 and 6 illustrate example web pages.

FIG. 5 illustrates an example web page 502 displayed in a web browser window 504. The example web page 502 includes several types of content items, such as a navigation bar 506, navigation panels 508, 510, and 512, a category browser 514, an anchor list 516, a footer 518, an ad 520, an ad group 522, and textual content 524.

The client-side boilerplate detection processes described above are capable of detecting several types and instances of boilerplate content included on the web page 502. For example, a boilerplate detection process may detect the navigation bar 506 and the category browser 514 as boilerplate content by determining that both the navigation bar 506 and the category browser 514 exhibit the anchor-block indicative traits of: defining a region that is associated with a block-level element, defining a region that has a width-to-height ratio of greater than a predetermined value, including two or more element objects as child objects, and including very little textual content other than the textual content that is associated with a link (e.g., the only text included in the navigation bar 506 is associated with "Link 1", "Link 2", . . . , "Link 13" and the majority of the text of the category browser is associated with the links "Top Level", "Category", "Subcategory 1", and "Subcategory 2").

Similarly, the navigation panel 508 and the navigation panel 510 may be detected as boilerplate content based on a determination that both the navigation panel 508 and the navigation panel 510 exhibit the anchor-block indicative traits of: defining a region that is associated with a block-level element, defining a region that has a height-to-width ratio of greater than a predetermined value, including two or more element objects as child objects, and including no textual content other than the textual content that is associated with a link (e.g., the only text included in the navigation panel 508 is associated with "Link A", "Link B", . . . , "Link H" and the only text included in the navigation panel 510 is associated with "Link to Video 1", "Link to Video 2", . . . , "Link to Video 8").

The navigation panel 512 may be identified as boilerplate content based on a determination that the navigation panel 512 exhibits the anchor-block indicative traits of: defining a region that is associated with a block-level element, defining a region that occupies less than a predetermined number of pixels, including two or more element objects as child objects, and including very little textual content other than the textual content that is associated with a link (e.g., the majority of the text included in the navigation panel 512 is associated with "Link to Past Article 1" and "Link to Past Article 2").

The anchor list 516 may be detected as boilerplate content based on a determination that the anchor list 516 exhibits the anchor-list indicative traits of: including anchor objects that are left-aligned with each other and including three or more anchor objects. The footer 518 may be identified as boilerplate content based on a determination that the footer 518 exhibits the footer-indicative traits of: appearing at the very bottom of the web page 502 and including a body element as a parent node.

The ad group 522 may be detected as boilerplate content based on a determination that each of the ads included in the ad group 522 (e.g., corresponding to "Ad Link 1", "Ad Link 2", "Ad Link 3", and "Ad Link 4") have the same target host name, that each of the ads included in the ad group 522 have an embedded URL, and that each of the ads included in the ad group 522 refer to out-of-domain resources. The ad 620 may be detected as boilerplate content based on a determination that the ad 520 exhibits the ad-indicative traits of the included "Get Coupon" link having an embedded URL, having an embedded URL in a URL referenced in associated script code, having the "Get Coupon" link refer to an out-of-domain resource, and having the URL for the "Get Coupon" link match a predefined URL pattern, such as a pattern associated with Google AdSense.

Figure 6:
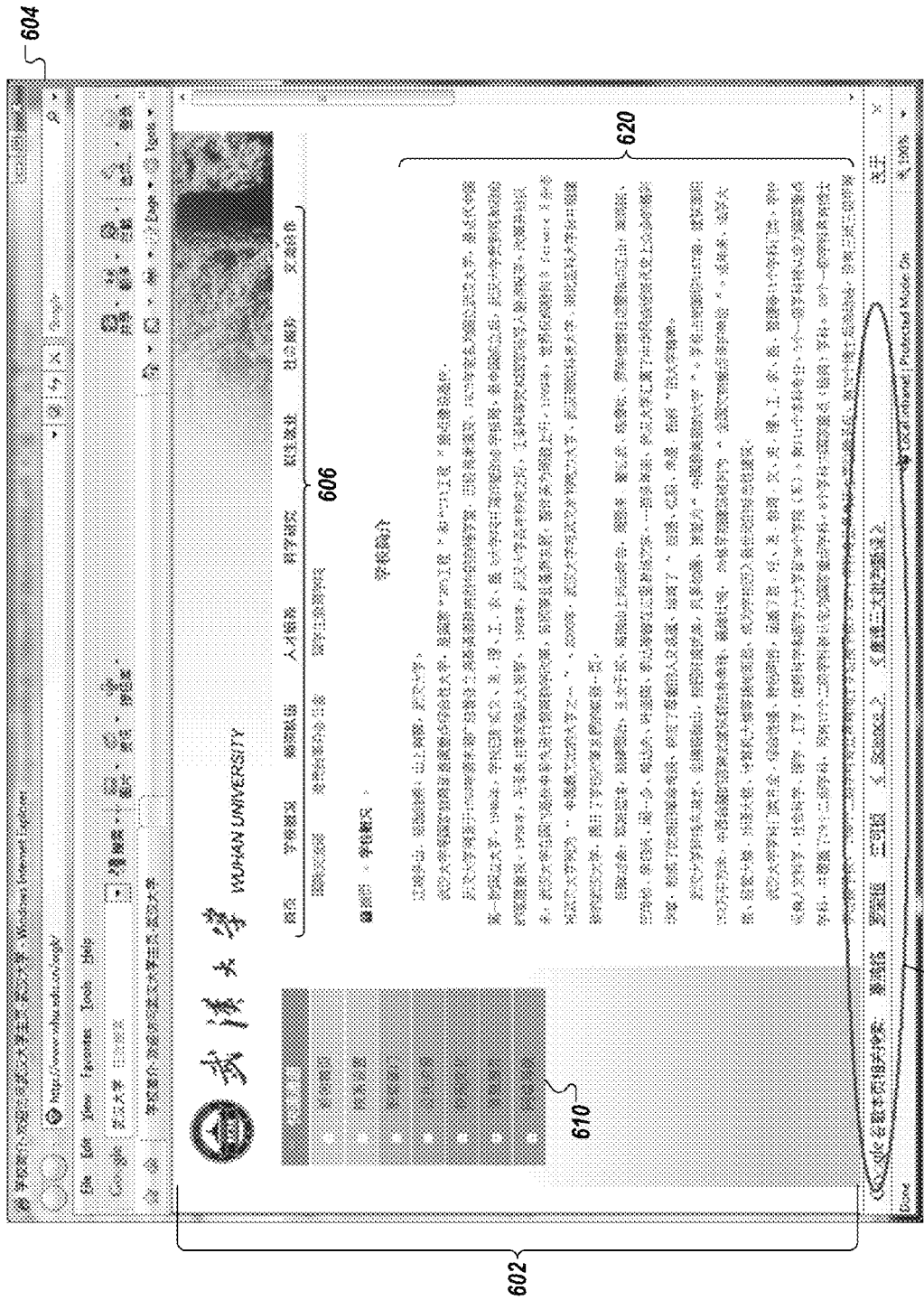

FIG. 6 illustrates an example web page 602 displayed in a web browser window 604. The example web page 602 includes several types of content items, such as a navigation bar 606, navigation panel 610, and textual content 620. A client-side boilerplate detection process is capable of detecting several types and instances of boilerplate content included on the web page 602. For example, content items 606 and 610 may each be detected as boilerplate content without examining the substance of textual content included in the content items 606 and 610. That is, the boilerplate detection process may identify boilerplate content included in the web page 602 despite the fact that the text included in the web page 602 is Chinese. Stated another way, the same boilerplate detection process may identify boilerplate content included in the English-text example web page 502 described above with respect to FIG. 5 and the Chinese-text example web page 602.

In further detail, a boilerplate detection process may detect the navigation bar 606 as boilerplate content by determining that the navigation bar 606 exhibits the anchor-block indicative traits of defining a region that is associated with a block-level element, defining a region that has a width-to-height ratio of greater than a predetermined value, including two or more element objects as child objects, and including very little textual content other than the textual content that is associated with a link.

Similarly, the navigation panel 610 may be detected as boilerplate content based on a determination that the navigation panel 610 exhibits the anchor-block indicative traits of defining a region that is associated with a block-level element, defining a region that occupies less than a predetermined number of pixels, including two or more element objects as child objects, and including no or very little textual content other than the textual content that is associated with a link.

A query recommendation engine may demote the importance of detected boilerplate content when applying a query recommendation technique. Query recommendation results may be sent to and displayed on the client device. For example and as shown in a web browser area 622, query recommendation results, that may include links to resources related to a primary topic of the web page 602 (e.g., a primary topic determined based on the non-boilerplate textual content 620) may be displayed in the web browser 604.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any appropriate form of programming language, including compiled or interpreted languages, and it can be deployed in any appropriate form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more appropriate processors of any appropriate kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any appropriate form of sensory feedback, e.g., visual feedback, auditory feedback, or tactile feedback; and input from the user can be received in any appropriate form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any appropriate combination of one or more such back end, middleware, or front end components. The components of the system can be interconnected by any appropriate form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any appropriate suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other object models (such as spreadsheets, relational databases, or structured files) may be used.

Thus, particular embodiments of the invention have been described. Other embodiments are within the scope of the following claims. For example, the actions recited in the claims can be performed in a different order and still achieve desirable results.

What is claimed is:

1. A system comprising:
   a client device; and
   a computer-readable medium coupled to the client device having instructions stored thereon which, when executed by the client device, cause the client device to perform operations comprising:
   receiving a resource from a server;
   selecting one or more nodes of a Document Object Model (DOM) tree for the resource;
   determining that the selected nodes exhibit one or more predefined traits that are characteristic of boilerplate content, wherein boilerplate content comprises content that is repeated in multiple resources of a particular web site;
   adjusting a boilerplate content score associated with the selected nodes responsive to determining that the selected nodes exhibit the predefined traits that are characteristic of boilerplate content; and
   providing information to a query recommendation engine, the information including textual content associated with the selected nodes, and the information identifying the adjusted boilerplate content score associated with the selected nodes.

2. The system of claim 1, wherein the resource comprises a markup language document.

3. The system of claim 1, wherein adjusting the boilerplate content score further comprises incrementing or decrementing the boilerplate content score based on determining that the selected nodes exhibit the predefined traits that are characteristic of boilerplate content.

4. The system of claim 1, wherein the operations further comprise:
   determining that the boilerplate content score satisfies a predetermined threshold; and
   providing information to a query recommendation engine responsive to determining that the boilerplate content score satisfies the predetermined threshold, the information identifying the textual content as boilerplate content.

5. The system of claim 4, wherein the content identified as boilerplate content comprises an anchor block.

6. The system of claim 5, wherein determining that the selected nodes exhibit the predefined traits that are characteristic of boilerplate content further comprises determining that the selected nodes are associated with a division-type, table-type, or list-type block-level element.

7. The system of claim 5, wherein determining that the selected nodes exhibit the predefined traits that are characteristic of boilerplate content further comprises determining that the selected nodes define a shape that includes fewer than a predetermined quantity of pixels.

8. The system of claim 5, wherein determining that the selected nodes exhibit the predefined traits that are characteristic of boilerplate content further comprises determining that the selected nodes define a shape that exhibits a height-to-width ratio or a width-to-height ratio that is greater than a predetermined value.

9. The system of claim 5, wherein determining that the selected nodes exhibit the predefined traits that are characteristic of boilerplate content further comprises determining that the selected nodes include at least a predetermined quantity of element objects as child nodes.

10. The system of claim 5, wherein determining that the selected nodes exhibit the predefined traits that are characteristic of boilerplate content further comprises determining that greater than a predetermined percentage of textual content associated with the selected nodes occurs within one or more link elements.

11. The system of claim 4, wherein the content identified as boilerplate content comprises an anchor list.

12. The system of claim 11, wherein determining that the selected nodes exhibit the predefined traits that are characteristic of boilerplate content further comprises determining that the selected nodes include at least a predetermined quantity of anchor objects as child nodes.

13. The system of claim 11, wherein determining that the selected nodes exhibit the predefined traits that are characteristic of boilerplate content further comprises determining that two or more anchor objects associated with the selected nodes are left aligned with each other.

14. The system of claim 4, wherein the content identified as boilerplate content comprises a footer.

15. The system of claim 14, wherein determining that the selected nodes exhibit the predefined traits that are characteristic of boilerplate content further comprises determining that the selected nodes define a shape that commonly occurs at a bottom of a web page.

16. The system of claim 14, wherein determining that the selected nodes exhibit the predefined traits that are characteristic of boilerplate content further comprises determining that the selected nodes include a body element as a parent node.

17. The system of claim 1, wherein the operations further comprise:
copying, during each of two or more time slices, different portions of the Document Object Model (DOM) tree until a complete copy of the DOM tree is obtained,
wherein selecting the nodes of the DOM tree further comprises selecting the nodes from the copy of the DOM tree, using a background thread.

18. A computer-implemented method comprising:
receiving a resource from a server;
selecting one or more nodes of a Document Object Model (DOM) tree for the resource,
determining that the selected nodes exhibit one or more predefined traits that are characteristic of boilerplate content, wherein boilerplate content comprises content that is repeated in multiple resources of a particular web site,
adjusting a boilerplate content score associated with the selected nodes responsive to determining that the selected nodes exhibit the predefined traits that are characteristic of boilerplate content, and
providing information to a query recommendation engine, the information including textual content associated with the selected nodes, and the information identifying the adjusted boilerplate content score associated with the selected nodes.

19. A non-transitory computer storage medium encoded with a computer program, the program comprising instructions that when executed by a client device cause the client device to perform operations comprising:
receiving a resource from a server;
selecting one or more nodes of a Document Object Model (DOM) tree for the resource;
determining that the selected nodes exhibit one or more predefined traits that are characteristic of boilerplate content, wherein boilerplate content comprises content that is repeated in multiple resources of a particular web site;
adjusting a boilerplate content score associated with the selected nodes responsive to determining that the selected nodes exhibit the predefined traits that are characteristic of boilerplate content; and
providing information to a query recommendation engine, the information including textual content associated with the selected nodes, and the information identifying the adjusted boilerplate content score associated with the selected nodes.

* * * * *